US012688796B2

(12) United States Patent
Chia et al.

(10) Patent No.: US 12,688,796 B2
(45) Date of Patent: Jul. 21, 2026

(54) EMERGENCY SURGICAL AIRWAY SURGERY SIMULATION DEVICE

(71) Applicant: Hospital Authority, Kowloon (HK)

(72) Inventors: Nam Hung Chia, Kowloon (HK); Lok Yee Madeleine Lam, Kowloon (HK); Wai Kwan Cheung, Kowloon (HK); Kwun Yip Wong, Kowloon (HK)

(73) Assignee: Hospital Authority, Kowloon (HK)

( * ) Notice: Subject to any disclaimer, the term of this patent is extended or adjusted under 35 U.S.C. 154(b) by 1183 days.

(21) Appl. No.: 17/585,246

(22) Filed: Jan. 26, 2022

(65) Prior Publication Data

US 2022/0246062 A1      Aug. 4, 2022

(30) Foreign Application Priority Data

Feb. 2, 2021   (HK) ........................... 32021024739.3
Apr. 9, 2021   (HK) ........................... 32021029033.6

(51) Int. Cl.
G09B 23/28        (2006.01)

(52) U.S. Cl.
CPC ................................. G09B 23/285 (2013.01)

(58) Field of Classification Search
None
See application file for complete search history.

(56) References Cited

U.S. PATENT DOCUMENTS

| | | | | |
|---|---|---|---|---|
| 3,704,529 | A * | 12/1972 | Cioppa ................ | G09B 23/285 |
| | | | | 128/207.29 |
| 4,773,865 | A * | 9/1988 | Baldwin ................ | G09B 23/30 |
| | | | | 434/274 |
| 5,584,701 | A * | 12/1996 | Lampotang .......... | G09B 23/285 |
| | | | | 434/262 |
| 2004/0126746 | A1* | 7/2004 | Toly ........................ | G09B 23/28 |
| | | | | 434/262 |
| 2012/0034587 | A1* | 2/2012 | Toly ........................ | G09B 23/30 |
| | | | | 434/267 |
| 2012/0202180 | A1* | 8/2012 | Stock ...................... | G09B 23/34 |
| | | | | 434/272 |
| 2017/0345341 | A1* | 11/2017 | Sakezles ................ | G09B 23/30 |
| 2018/0144662 | A1* | 5/2018 | Tassone ............... | G09B 23/306 |

FOREIGN PATENT DOCUMENTS

| | | |
|---|---|---|
| CN | 201570170 | 9/2010 |
| CN | 201838241 | 5/2011 |
| CN | 202662214 | 1/2013 |
| CN | 107945637 | 4/2018 |

* cited by examiner

*Primary Examiner* — James B Hull
(74) *Attorney, Agent, or Firm* — PABST PATENT GROUP LLP

(57)          ABSTRACT

There is provided an artificial anatomical model for simulating a cricothyroidotomy procedure. The model comprises an upper body structure including a neck member with a tracheal access window spanned by a membrane. Disposed within the neck member is an anatomically accurate larynx-trachea structure under the membrane. This structure comprises a first member of a rigid first material shaped and dimensioned to define a cricothyroid space overlying an incisable artificial cricothyroid membrane material of a second member which is received therein. The second member member seals off an expansible chamber in fluid communication therewith.

15 Claims, 9 Drawing Sheets

(i)

(ii)

(iii)

EMERGENCY SURGICAL AIRWAY SURGERY SIMULATION DEVICE

FIELD OF THE DISCLOSURE

The present disclosure relates to a realistic simulation apparatus and system for practicing emergency airway access using procedures such as cricothyroidotomy/cricothyrotomy.

BACKGROUND OF THE DISCLOSURE

Upper airway obstruction can lead to a fatality in a patient if not swiftly resolved. However, sometimes it may not be possible to establish an airway by bag/mask ventilation, use of endotracheal tubes or supraglottic devices for a patient who has presented with an upper airway obstruction (e.g. from facial trauma, foreign body or allergic reaction). In these situations it may be necessary to conduct an emergency cricothyroidotomy to facilitate airway access, in preference to a tracheotomy which is slower and may require manipulation of the cervical spine.

In such situations it is imperative that the staff in the operating room, emergency department or intensive care units performing the procedure have experience and knowledge prior to actually performing the procedure on a patient; in order to perform the procedure quickly and effectively.

Although it may be possible to train in the performance of procedures on static anatomical models, cadavers or tissue sourced from animals (e.g. pigs), these training models can be unrealistic and fail to adequately prepare staff for performing the procedure under real-life, stressful conditions.

Accordingly, it is an object of the present disclosure to provide a surgical simulation device which substantially addresses or at least ameliorates these issues or provides a useful choice to the public.

SUMMARY OF THE DISCLOSURE

Features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims.

In accordance with a first aspect of the present disclosure, there is provided an artificial anatomical model for simulating a cricothyroidotomy procedure, the model comprising:
an upper body structure including a neck member with a tracheal access window spanned by a membrane
an anatomically accurate larynx-trachea structure disposed within the neck member under the incisable resilient membrane; said structure comprised of a rigid first material and including an incisable artificial cricothyroid membrane disposed therein configured for alignment in the tracheal access window, said incisable artificial cricothyroid membrane material sealing off an expansible chamber in fluid communication therewith.
a simulated larynx-trachea structure disposed within the neck member under the membrane and configured for alignment in the tracheal access window; said simulated larynx-trachea structure comprising a first member of a rigid first material shaped and dimensioned to define a cricothyroid space overlying an incisable artificial cricothyroid membrane material of a second member received therein, said second member sealing off an expansible chamber in fluid communication therewith.

Advantageously, the rigid first material of the anatomically accurate larynx-trachea structure comprises polylactide.

Optionally, the incisable artificial cricothyroid membrane comprises polyvinyl chloride and plasticiser.

Preferably, the membrane comprises silicone.

Optionally, the expansible chamber includes an actuable carbon dioxide reservoir configured to deliver a predetermined amount of carbon dioxide to the expansible chamber upon actuation of a pressure sensor. The pressure sensor may further include circuitry for regulating the timing of the delivery of the predetermined amount of carbon dioxide to the expansible chamber.

The expansible chamber may be connected to a reservoir of vaporisable alcohol.

Advantageously, the measured compliance profile of the expansible chamber approximates a measured compliance profile for lungs of a human patient.

Preferably, the expansible chamber is configured to expand upon introduction of air into the model through an endo-tracheal tube inserted through an incision made in the incisable artificial cricothyroid membrane.

Advantageously, the expansible chamber is inflated to a higher pressure relative to the external environment before the cricothyroidotomy procedure is commenced.

The incisable resilient membrane spanning the tracheal access window, the incisable artificial cricothyroid membrane, and the anatomically accurate larynx-trachea structure are preferably independently replaceable.

In a further aspect, there is provided system for simulating a cricothyroidotomy procedure, the system comprising:
an artificial anatomical model comprising
an upper body structure including a neck member with a tracheal access window spanned by an incisable resilient membrane;
an anatomically accurate larynx-trachea structure disposed within the neck member under the incisable resilient membrane; said structure comprised of a relatively rigid material and including an incisable artificial cricothyroid membrane material aligned in tracheal access window, said incisable cricothyroid membrane material sealing an expansible chamber in fluid communication therewith; and
a simulated larynx-trachea structure disposed within the neck member under the membrane and configured for alignment in the tracheal access window; said simulated larynx-trachea structure comprising a first member of a rigid first material shaped and dimensioned to define a cricothyroid space overlying an incisable artificial cricothyroid membrane material of a second member received therein, said second member sealing off an expansible chamber in fluid communication therewith.
a carbon dioxide reservoir in fluid communication with the expansible chamber configured for dispensing a predetermined amount carbon dioxide into the expansible chamber upon detection of a change in pressure.

The system may further include circuitry for regulating the timing of the delivery of the predetermined amount of carbon dioxide to the pressurised expansible chamber.

Optionally, the expansible chamber may be connected to a reservoir of vaporisable alcohol.

Advantageously, the measured compliance profile of the pressurised expansible chamber approximates a measured compliance profile of lungs of a human patient.

Preferably, the expansible chamber is configured to expand upon introduction of air into the model through an endo-tracheal tube inserted through an incision made in the cricothyroid membrane. The expansible chamber may be inflated to a higher pressure relative to the external environment before the cricothyroidotomy procedure is commenced.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings.

Preferred embodiments of the present disclosure will be explained in further detail below by way of examples and with reference to the accompanying drawings, in which:—

FIG. 2C shows a photograph of an exemplary assembled trachea structure.

FIG. 2D is an enlarged partial view of the photograph of the exemplary trachea structure of FIG. 2C.

DETAILED DESCRIPTION OF THE PREFERRED EMBODIMENTS

Various embodiments of the disclosure are discussed in detail below. While specific implementations are discussed, it should be understood that this is done for illustration purposes only. A person skilled in the relevant art will recognize that other components and configurations may be used without departing from the spirit and scope of the disclosure.

The disclosed technology addresses the need in the art for a realistic model for simulation of crico-thyroidotomy and other surgical procedures for enabling emergency airway access. Advantageously, as described below the realistic model and system of the present disclosure mimics certain physiological responses of real patients for enhancing the effectiveness of the training as is disclosed in more detail below.

Figure 1A:
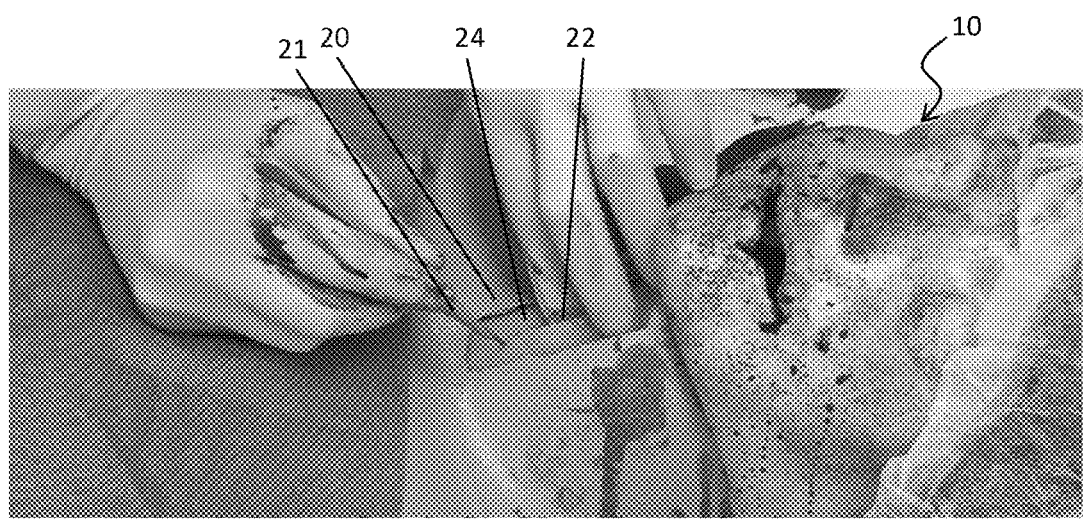
FIG. 1A depicts an exemplary view of an embodiment of the simulation model and system of the present disclosure.

FIG. 1A depicts an exemplary longitudinal incision being made with a scalpel held by a medical personnel in the neck 20 of the model 10, as is typical in a case where anatomical landmarks cannot be identified. In particular, the incision is being made in the tracheal access window 22 into "skin" like material 24 or a skin like membrane which extends across the window 22, and which overlies a larynx-trachea structure (not shown). Advantageously, the skin material may be selected so as to have similar mechanical properties when incised by a scalpel as human skin, typically using materials such as silicon or similar.

Figure 1B:
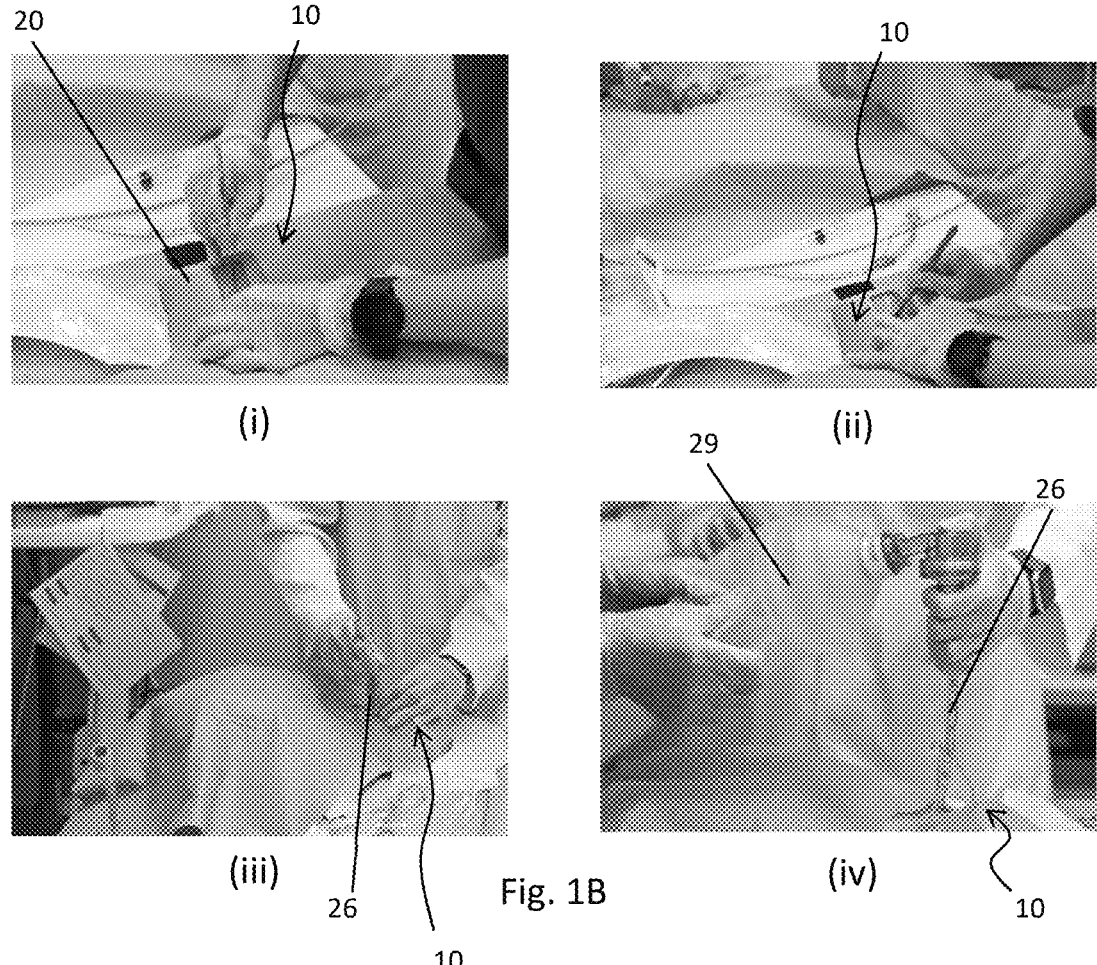
FIG. 1B depicts the various steps in simulated cricothyroidotomy procedure using the simulation model and system depicted in FIG. 1A.

Another view is shown of this stage of the cricothyroidotomy procedure in FIG. 1B(i), in which the head of the model 10 has being removed for clarity.

In the next step of the procedure, a transverse incision is made in the "skin" material and in the membrane in the cricothyroid space 40 of the second component 58 underlying the tracheal access window of the model 10. As would be appreciated by persons skilled in the art, and described in more detail with reference to the exemplary larynx trachea 30 structure depicted by FIGS. 2A-2D, making the transverse incision at the correct position in the cricothyroid membrane is important.

Figure 3A:
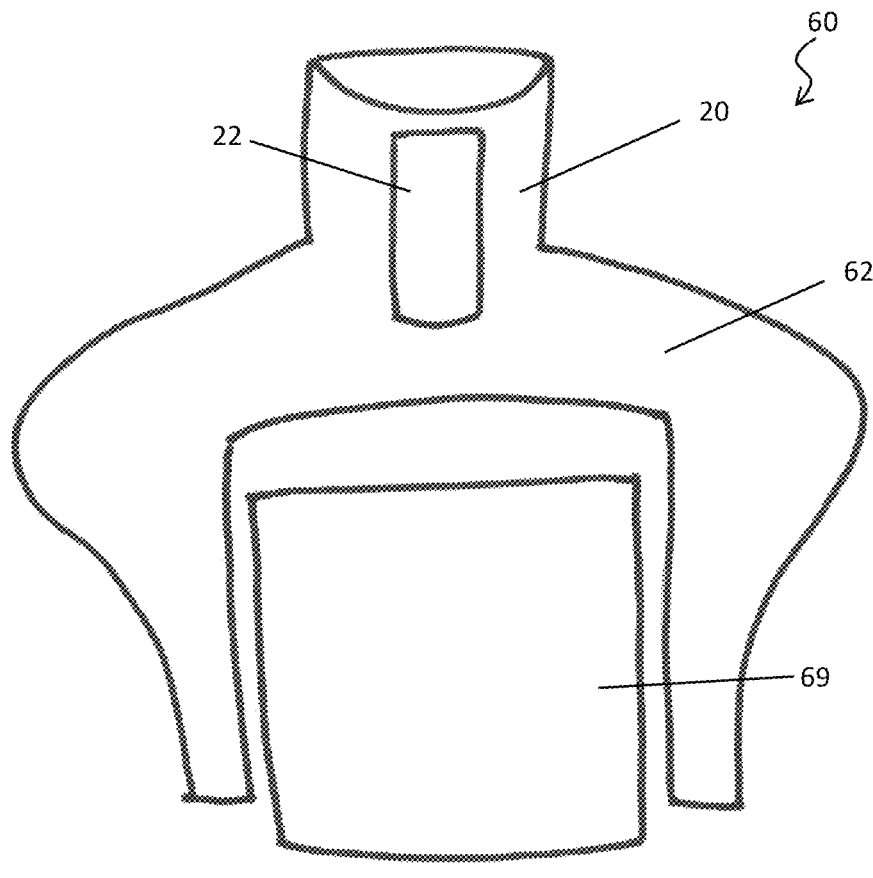
FIG. 3A depicts a schematic view of the exemplary anatomical model shown in FIG. 1A prior to insertion of the trachea structure depicted in FIGS. 2A-2D.
Figure 3B:
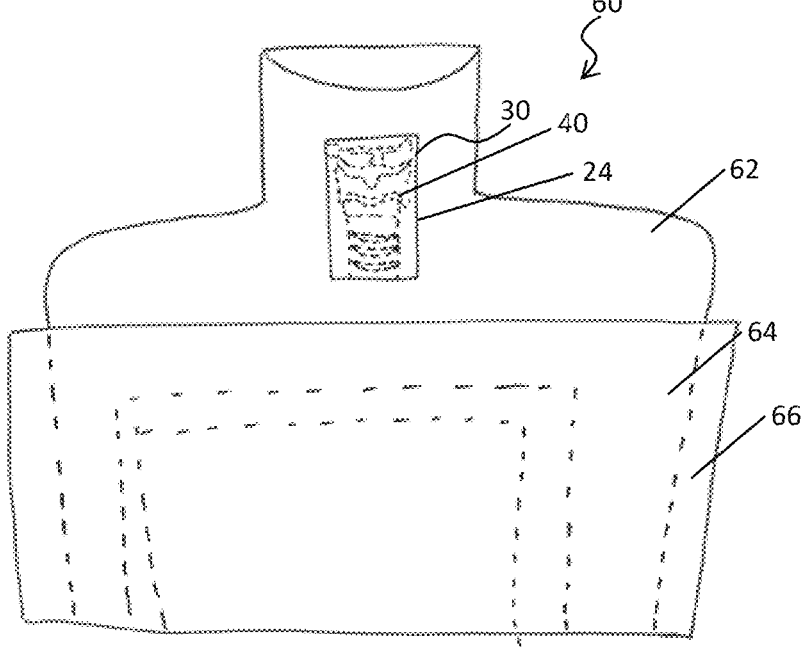
FIG. 3B depicts a schematic view of the exemplary anatomical model shown in FIG. 3A following the insertion of the trachea structure depicted in FIGS. 2A-2D.
Figure 3C:
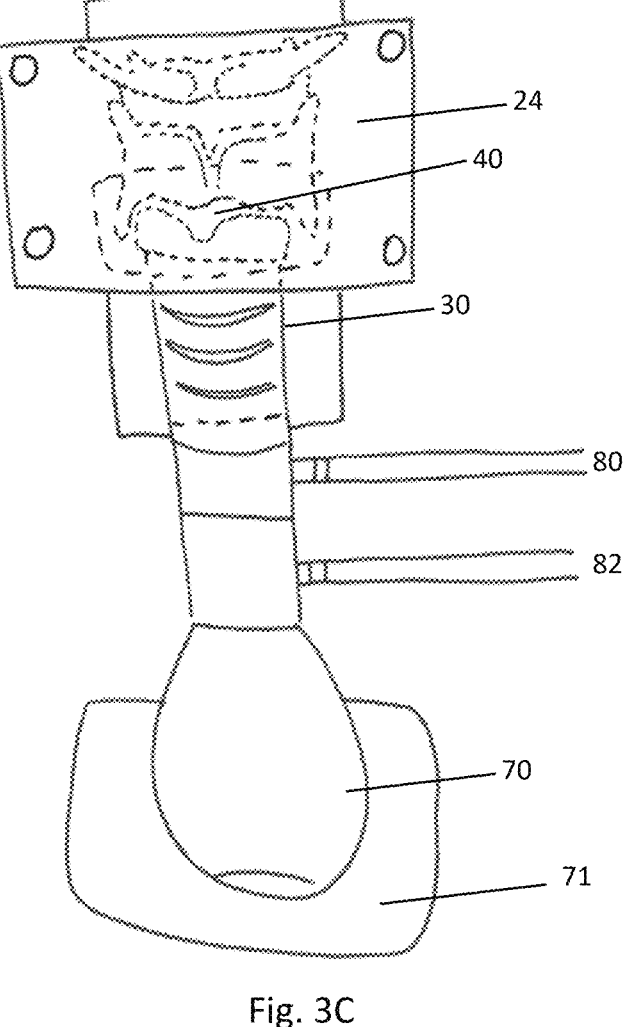
FIG. 3C depicts an enlarged exemplary schematic view of the trachea structure under the skin and situated in the anatomical model, with the other parts of the model removed for clarity.
Figure 3D:
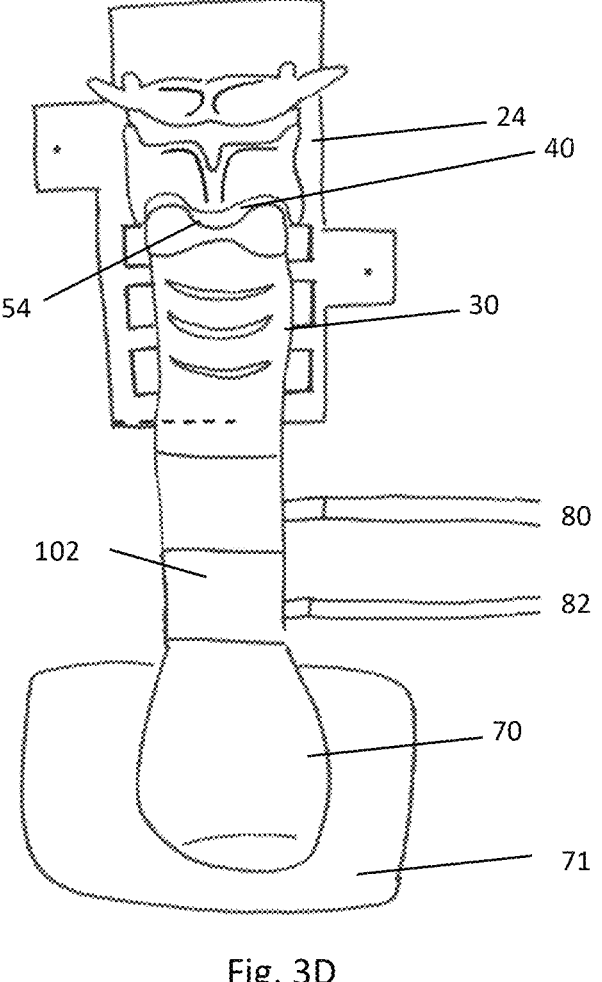
FIG. 3D depicts the enlarged exemplary schematic view of the trachea structure of FIG. 3C as positioned in the model, with the skin and the rest of the model removed for clarity.

An incision in the correct location will typically result in the escape of gas from a sealed chamber in the chest portion of the model (se FIG. 3C, FIG. 3D). The chamber is advantageously pressurised at a higher pressure to provide confirmation to the operator correctly making an incision in the cricothyroid membrane, similar to in a human patient of a hissing sound created by escaping air.

In yet a further optional embodiment, an amount of vaporised alcohol may also be included in the expelled gas which can be used to achieve fogging of the endotracheal tube, as would be experienced in a cricothyroidotomy procedure carried out on a real patient.

The person performing the procedure might utilize a bougie device, a semi-rigid, straight piece of plastic with a one-inch tip at a 30-degree angle, to provide rigidity to the tube and assist with guiding placement (not shown)

Referring to FIG. 1B(iii), it can be seen that an endotracheal tube 26 is inserted through the incision made in the tracheal access window 22.

As depicted in FIG. 1B(iv), the endotracheal tube 26 is attached to a ventilation bag 29 for introducing air into the system. As will be discussed further below, squeezing the bag forces air into the sealed chamber, which in turn can result in the "chest" region of the model 10 rising. Optionally, carbon dioxide may also be dispensed into the chamber from a reservoir upon successfully increasing the pressure in the chamber (e.g. by bagging) which is detected by a sensor, to further increase the realism of the training scenario as is discussed further below.

FIGS. 2A-2E depict various representations of an exemplary larynx-trachea structure 30 in a model used in an embodiment of the present disclosure.

As is known to persons skilled in the art, the larynx 31 comprises a hyoid bone 32 which sits at the top of the larynx trachea structure 30 and above a thyrohyoid membrane 34 and thyrohyoid ligaments (not shown).

Between the thyroid cartilage 36 and cricoid cartilage 38 is the cricothyroid space 40, which includes cricothyroid ligaments and membrane. It is this area cut in the cricothyroidotomy procedure. In adults, the typical size of the cricothyroid membrane is approximately 4 mm-10 mm so it is a relatively small target which must be located with precision and accuracy in an often stressful situation of airway obstruction. In the exemplary embodiment depicted, the gap is at the narrower end of 4 mm, as is typical in females.

The cricoid cartilage 38 connects the larynx 31, with the trachea 41; and facilitates connectivity of different ligaments, cartilages and muscles which facilitate the opening and shutting of the air passage and the passage of sound. Advantageously, the cricoid cartilage is known to medical personnel as a useful palpable anatomical landmark.

Below the cricoid cartilage 38, in the model depicted five-seven tracheal "rings" 42 were printed to represent the sixteen to twenty tracheal rings in humans which support the trachea 31 and allow it to move and flex during breathing.

Figure 2A:
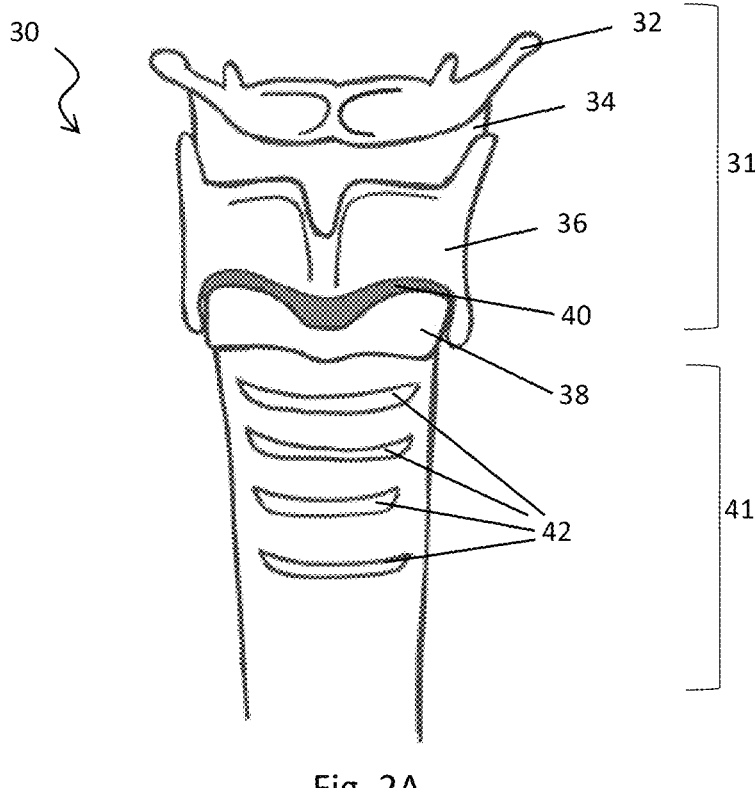
FIG. 2A depicts a simplified schematic top view of a trachea structure used in the simulation model and system of FIG. 1A.
Figure 2B:
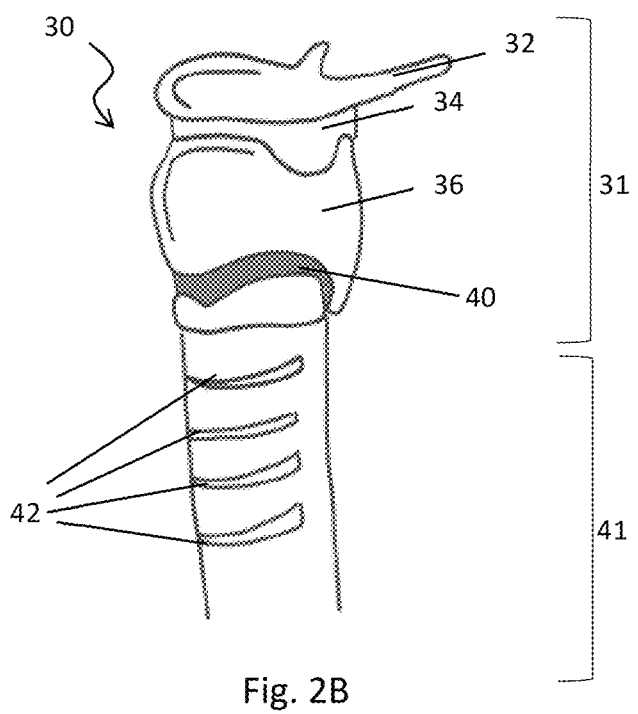
FIG. 2B depicts a simplified schematic left side view of the trachea structure of FIG. 2A.
Figure 2E:
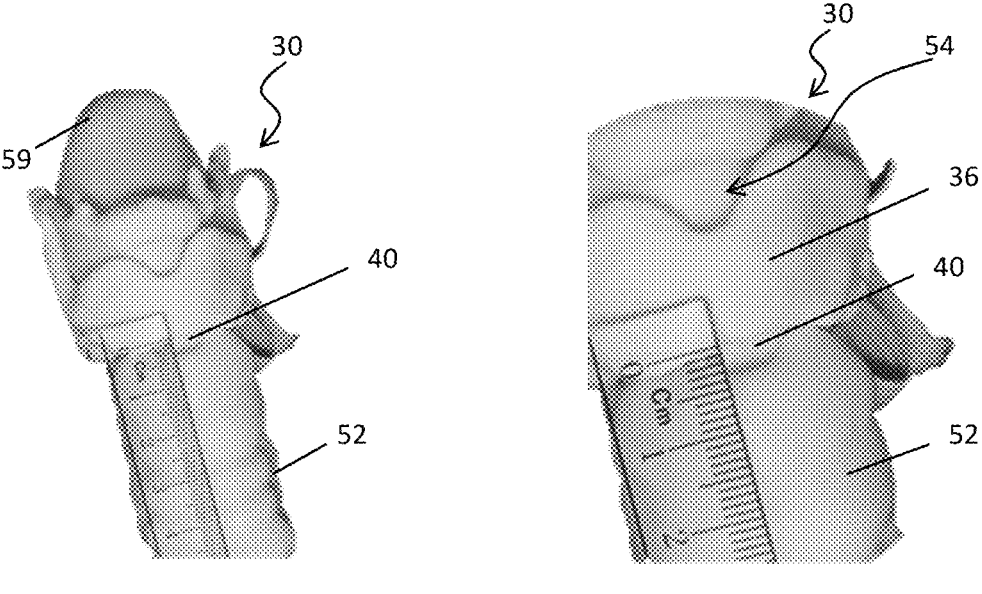
FIG. 2E is a photograph depicting individual components of the disassembled trachea structure of FIG. 2C.
Figure 2E:
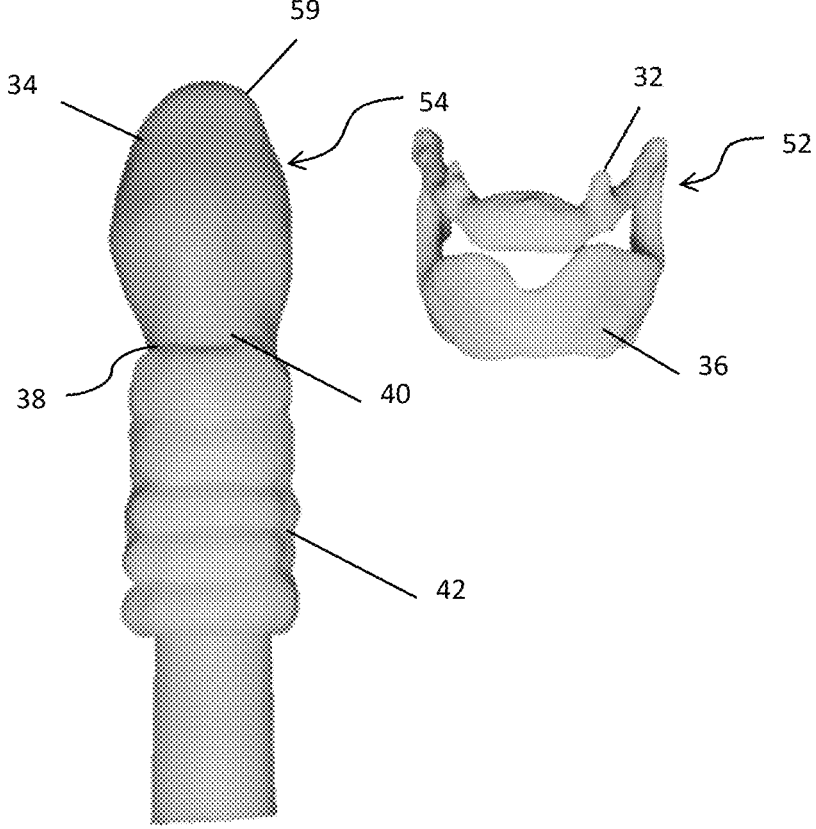

Referring now to FIG. 2C-FIG. 2E, it can be seen that the larynx-trachea structure 30 includes two main components. The first component 52 is the relatively hard structure representing or mimicking the anatomy of a real human patient in the trachea larynx structure 30. Advantageously, this first component 52 may be formed by a three dimensional printer such as a fused filament fabrication 3D printer, and may be made from material such as Polylactic acid or similar. Other materials could include ABS, PET, Nylon or the like without departing from the scope of the present disclosure. Advantageously the first component 52 represents the hyoid bone 32 and the thyroid cartilage 36.

The second component 54 is the resilient and incisable material which forms the cricothyroid membrane—the membrane spanning the cricothyroid space 40, together with the thyohyoid membrane 34, tracheal rings 42 cricoid cartilage 38.

The thickness of the various regions of the second component is advantageously different at different portions. Advantageously, the portion of the second component spanning the cricothyroid space 40 is molded so that it has a thickness of 1.5 mm so that it is relatively easily incisable, whereas the regions of the second component representing the thyohyoid membrane 34, tracheal rings 42 and cricoid cartilage 38 are orders of magnitude thicker.

Overall, the second component 54 defines an air tight chamber, until an incision is made in the portion of the second component spanning the cricothyroid space 40 defined by the (relatively harder) first component 52.

Preferably this may be made from material such as Polyvinyl chloride (with plasiticiser) or similar such that it is relatively softer and deformable, and able to be cut with a scalpel or similar. Advantageously, if polyvinyl chloride is used this may further include plasticisers, stabilisers of the like. Other alternatives may include other relatively soft materials such as polypropylene or polyethylenes without departing from the scope of the present invention.

It would be appreciated that the relatively soft second component 54 has the first component 52 mounted thereon at the thyrohyoid membrane 34, and the top portion 59.

Referring now to FIG. 3A, there is depicted an exemplary schematic anatomical model 60 shown in FIG. 1A prior to insertion of the trachea structure depicted in FIGS. 2A-2D. The model includes a neck 20, tracheal window 22 and a torso region 62, which encloses a flap 69 covering the removable expansible chamber 70 (not shown). The expansible chamber is configured so that it may be able to expand and contract with changes in pressure.

As depicted in FIG. 3B, the model may be prepared for the training procedure, by including the larynx-trachea structure 30 under a skin material 24 in the tracheal window 22 of the neck 20. The "chest" region 64 of the torso 62 may be covered by a blanket 66.

Referring now to FIG. 3C, there is depicted an enlarged exemplary schematic view of the trachea larynx structure 30 under the skin 24 and situated in the anatomical model, with the other parts of the model removed for clarity. The rest of the model 60 has been removed for clarity.

Also shown is the expansible chamber 70 which via an intervening segment 102 is in air tight communication with the underlying second component 54 (a small portion visible e.g. at cricothyroid space 40) included in the larynx-trachea structure 30. The rectangular portion 71 underlying the expansible chamber 70 is a schematic representation of heating or warming pad for vaporising an amount of alcohol which may be introduced into the expansible chamber 70 for simulating fogging of the endotracheal tube upon successful insertion.

The volume defined by these components is connected to a gas line 80 which leads to a pressure sensor (not shown). Also depicted in a gas line 82 for including a predetermined amount of Carbon dioxide ($CO2$) from a reservoir (also not shown).

FIG. 3D depicts a similar arrangement to that shown in FIG. 3C, with the skin 24 removed for clarity.

Figure 4A:
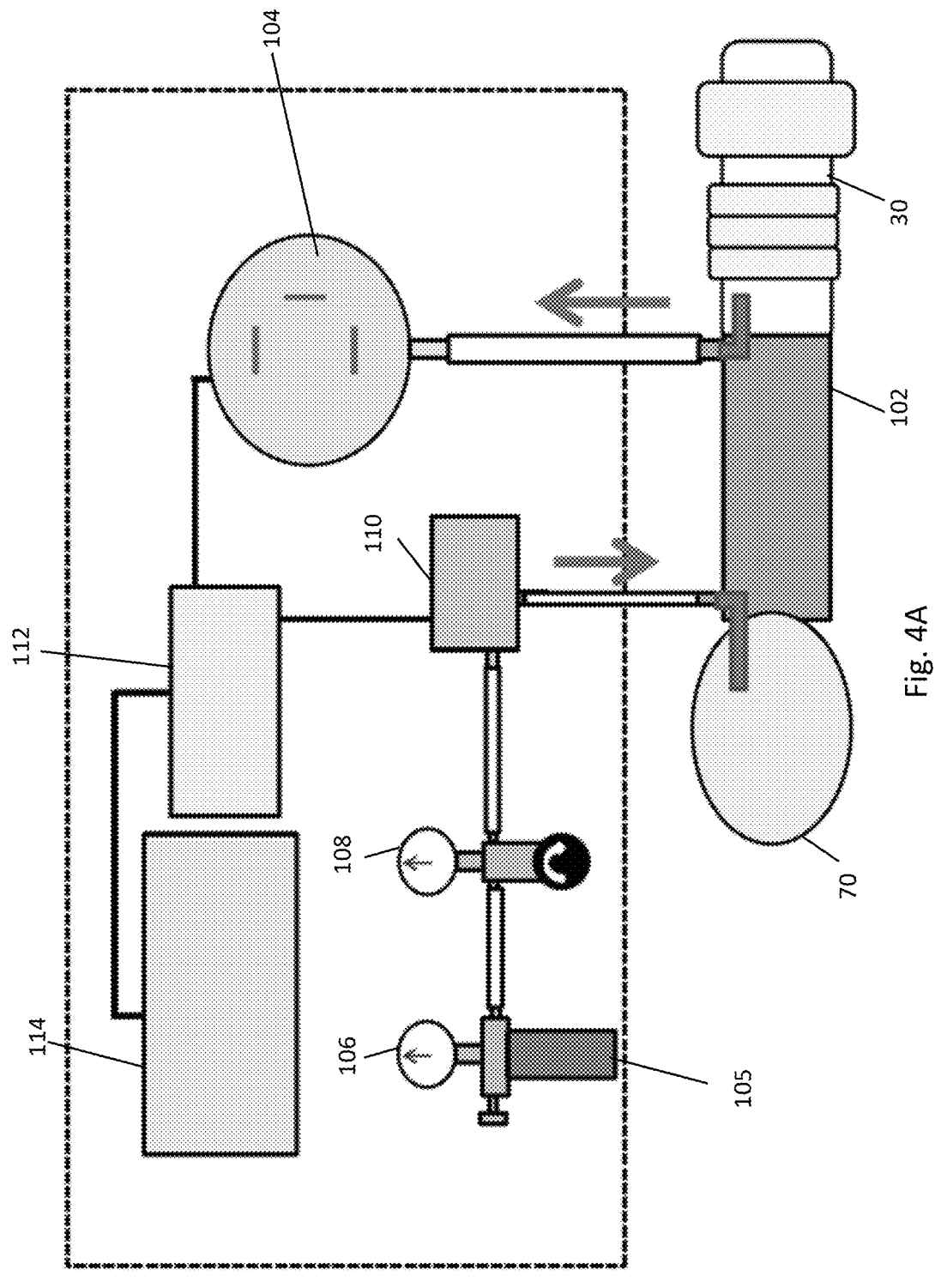
FIG. 4A depicts a schematic component diagram of the simulation model and system depicted in FIG. 1A.
Figure 4B:
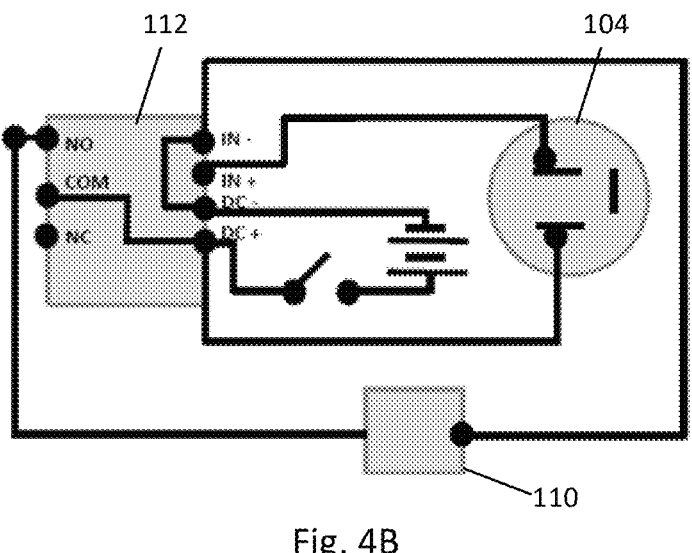
FIG. 4B depicts a schematic circuit diagram of the simulation model and system depicted in FIG. 4A.

Referring to FIG. 4A, there is depicted an exemplary schematic component diagram of the simulation model and system depicted in FIG. 1A; and an exemplary schematic circuit diagram of the simulation model and system As depicted the trachea larynx structure 30 is connected via an intervening segment 102 to an expansible chamber 70, which is configured to mimic the activity of a human lung by expanding and contracting with changes in pressure.

Also connected with the trachea larynx structure 30 is a pressure sensitive sensor (e.g. switch) 104 which may be configured to be actuated upon a change in pressure caused by the introduction of air into the system through an endotracheal tube.

Advantageously, a reservoir comprising a carbon dioxide cartridge 105 may be connected with the expansible chamber 70 via a flow regulator 106 and gas pressure regulator 108 and a solenoid valve 110.

Optionally the solenoid valve 110 may be coupled to a time control relay 112, which is in turn electrically coupled to the pressure sensitive switch 104. The time control relay or similar circuitry may be powered by a power supply 114 such as a battery or other power source.

Upon actuation of the pressure sensitive sensor (e.g. caused the addition of air via an endotracheal tube through the incision), and at an appropriate time in the cycle of pressure increase during the external ventilation process, the time control relay circuit 112 may be configured to open the solenoid valve 110 to cause it to emit a predetermined amount of carbon dioxide into the expansible chamber 70.

Advantageously, the amount used may be 10-40 ml of carbon dioxide ($CO2$), preferably 10-30 ml of carbon dioxide and more preferably 20 ml of carbon dioxide.

The fixed volume of carbon dioxide can be delivered under the control of the circuitry described to the system at an appropriate time in each assisted ventilation cycle of the model.

It would be appreciated that this expansible chamber which is in communication with the trachea larynx structure 30, and the carbon dioxide is then emitted from the trachea where it can be detected in an end tidal carbon dioxide detector. This may be performed using qualitative detectors such as a colorimeter or quantitative detectors such as a capnometer.

Capnography has been shown to be a highly reliable method of endotracheal tube confirmation. A properly positioned tube in the trachea will produce a reliable carbon dioxide waveform that can be detected reliably by these sensors. Unsuccessful tracheal intubation will not transmit carbon dioxide to the detector and would indicate improper placement.

Additional methods of confirming tube position include direct visualization of the glottis, auscultation for breath sounds and inspection for chest rise during ventilation.

Continuous carbon dioxide monitoring of an intubated patient can also help identify accidental endotracheal tube displaced during transport or movement of a patient. Continuous monitoring can also help detect other post-intubation complications such as airway obstruction from a kinked endotracheal tube or mucous plugging Advantageously, alcohol vapour may be also introduced into the expansible chamber 70 to replicate fogging on an endotracheal tube which has been inserted at the correct location, providing a further sign of a procedure having been appropriately performed. Advantageously the volume of the alcohol may be between 5-10 ml, vaporised through the inclusion of warming pad 71 or similar.

Figure 5:
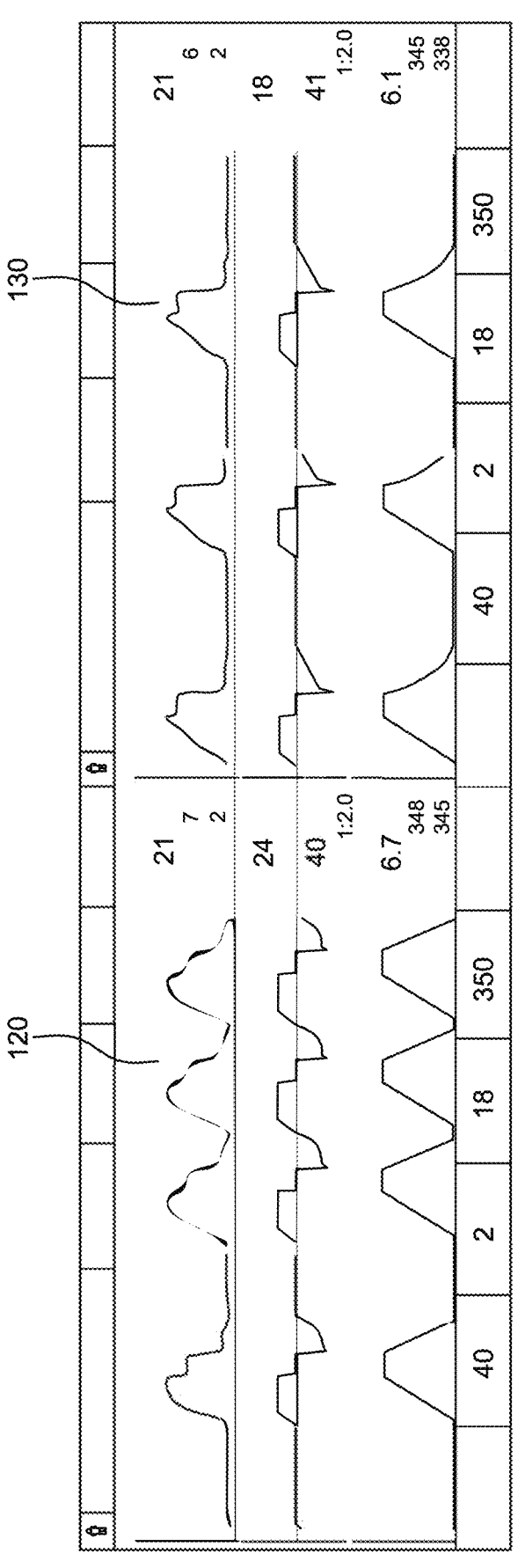
FIG. 5 depicts the exemplary lung compliance profile of the simulation model and system as well as the compliance profile of a human patient.

FIG. 5 depicts the exemplary lung compliance profile of the simulation model and system as well as the compliance profile of a human patient.

As would be appreciated by persons skilled in the art, compliance of a system is the change in volume that occurs per unit change in pressure of the system. In this case, the compliance is therefore a measurement of the elastic resistance of the system.

$$\text{Lung Compliance}(C)=\text{Change in Lung Volume}(V)/\text{Change in Transpulmonary Pressure}$$

The change in transpulmonary pressure may be calculated by the following expression:

$$\text{Alveolar Pressure(Palv)}-\text{Pleural Pressure(Ppl)}$$

When different readings of the lung volume are taken at specific measured pressure points 120, 130 and then plotted on a diagram, a pressure-volume curve representing both elastic and airway resistance properties of the lung is obtained similar to that depicted.

As can be seen in the images obtained the compliance of the torso region of the model and a test lung are very similar in the image depicted.

As is known to persons skilled in the art, performance of an emergency cricothyroidotomy is a procedure which requires practice before actually needing to perform in a real life setting.

The disclosed model and system replicates in an effective way many of the aspects of the procedure.

Advantageously, the anatomically correct model used in the trachea larynx structure enables appropriate localisation of the cricothyroid membrane. This can be contrasted with models and animal tracheas which have a different anatomy;

and are unhelpful in familiarising the person operating on the model with real appropriate anatomical landmarks of a person.

Furthermore, in an optional aspect of the disclosure, the "skin" 24 and the incisable artificial cricothyroid membrane material may also include simulated blood receptacles underneath, which will enhance the overall realism by leaking blood when incisions are made.

The expulsion of gas from the higher pressure chamber relative to the external environment provides an initial indication to the person operating on the model of a successful procedure; replicating what would be experienced in a procedure on a patient.

Similarly, the introduction of carbon dioxide in the model and system of the present disclosure provides a further way in which a successful procedure can be verified, using the capnometer or colorimeter. Finally, the lung compliance profile of the model and system could also be configured to be able to be measured such that it is referable to that of an actual patient, with the increase in volume of the expansible chamber reminiscent of a rise in the chest of an actual patient when supplying external air via "bagging".

In this way, the person performing procedure is trained with each step of the procedure, including the various checks which are performed to confirm success of the procedure.

The above embodiments are described by way of example only. Many variations are possible without departing from the scope of the disclosure as defined in the appended claims.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. An artificial anatomical model for simulating a cricothyroidotomy procedure, the model comprising:
   an upper body structure including a neck member with a tracheal access window spanned by a membrane; and
   an anatomically accurate larynx-trachea structure disposed within the neck member under the membrane; said structure comprised of a rigid first material and including an incisable artificial cricothyroid membrane disposed therein configured for alignment in the tracheal access window, said incisable artificial cricothyroid membrane material sealing off an expansible chamber in fluid communication therewith,
   wherein the expansible chamber is connected to a reservoir of vaporisable alcohol.

2. The artificial anatomical model according to claim 1, wherein the rigid first material of the anatomically accurate larynx-trachea structure comprises polylactide.

3. The artificial anatomical model according to claim 1, wherein the incisable artificial cricothyroid membrane comprises polyvinyl chloride and plasticiser.

4. The artificial anatomical model according to claim 1, wherein the membrane spanning the tracheal window comprises silicone.

5. The artificial anatomical model according to claim 1, wherein the expansible chamber includes an actuable carbon dioxide reservoir configured to deliver a predetermined amount of carbon dioxide to the expansible chamber upon actuation of a pressure sensor.

6. The artificial anatomical model according to claim 5 further including circuitry for regulating the timing of the delivery of the predetermined amount of carbon dioxide to the expansible chamber.

7. The artificial anatomical model according to claim 1, wherein a measured compliance profile of the expansible chamber approximates a measured compliance profile for lungs of a human patient.

8. The artificial anatomical model according to claim 1, wherein the expansible chamber is configured to expand upon introduction of air into the model through an endo-tracheal tube inserted through an incision made in the incisable artificial cricothyroid membrane.

9. The artificial anatomical model according to claim 1, wherein the expansible chamber is inflatable to a higher pressure relative to the external environment.

10. The artificial anatomical model according to claim 1, wherein the incisable resilient membrane spanning the tracheal access window, the incisable artificial cricothyroid membrane, and the anatomically accurate larynx-trachea structure are independently replaceable.

11. A system for simulating a cricothyroidotomy procedure, the system comprising:

an artificial anatomical model comprising, an upper body structure including a neck member with a tracheal access window spanned by an incisable resilient membrane; and an anatomically accurate larynx-trachea structure disposed within the neck member under the incisable resilient membrane; said structure comprised of a relatively rigid material and including an incisable artificial cricothyroid membrane material aligned in tracheal access window, said incisable cricothyroid membrane material sealing an expansible chamber in fluid communication therewith, wherein the expansible chamber is connected to a reservoir of vaporisable alcohol.

12. The system of claim 11 further comprising circuitry for regulating timing of delivery of a predetermined amount of carbon dioxide to the pressurised expansible chamber.

13. The system of claim 11, wherein a measured compliance profile of the pressurised expansible chamber approximates a measured compliance profile of lungs of a human patient.

14. The system of claim 11, wherein the expansible chamber is expansible upon introduction of air into the model through an endo-tracheal tube inserted through an incision made in the cricothyroid membrane.

15. The system of claim 11, wherein the expansible chamber is inflated to a higher pressure relative to the external environment before the cricothyroidotomy procedure is commenced.

* * * * *